Figure 1:
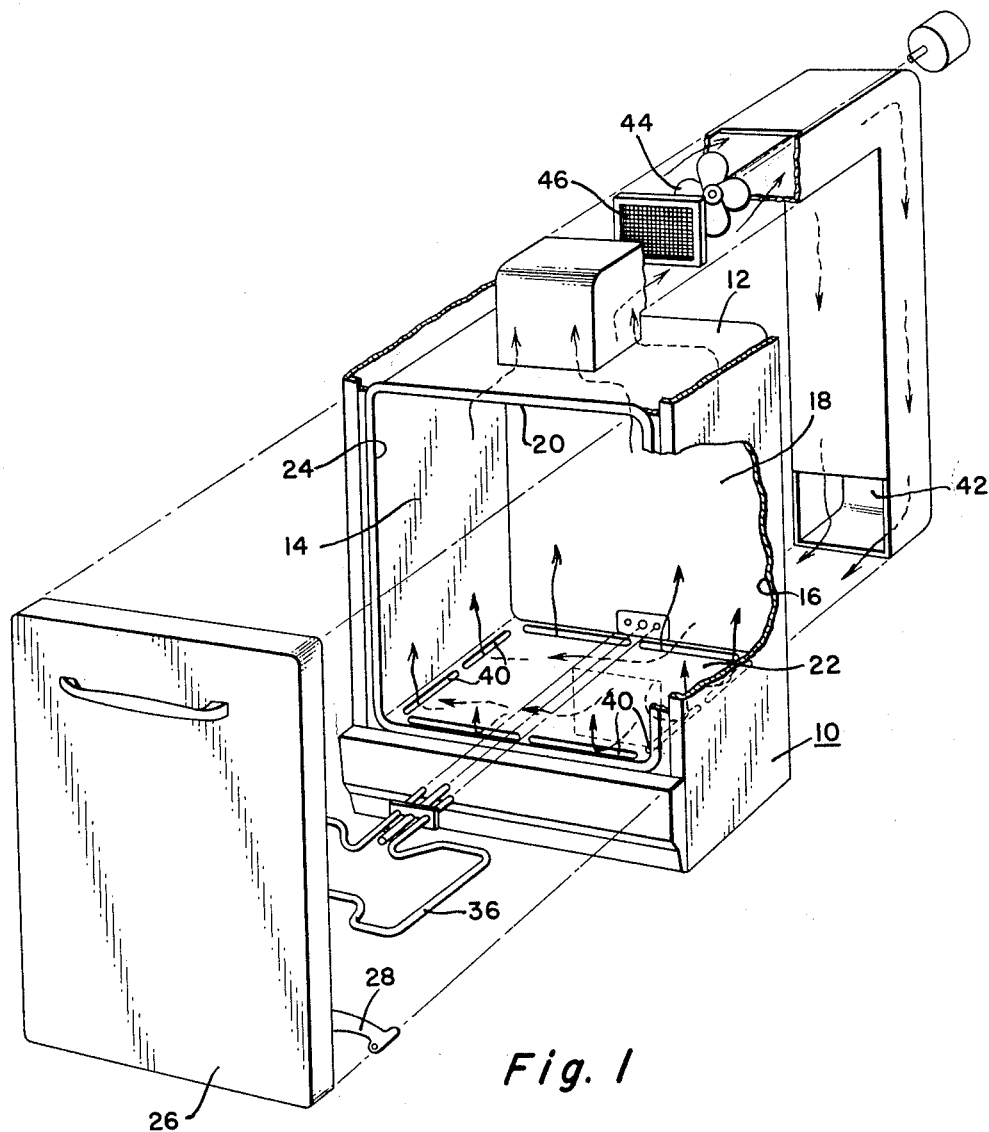

Dec. 8, 1964  W. L. DRAYER  3,160,153
DOMESTIC OVEN

Filed Dec. 21, 1962  2 Sheets-Sheet 2

INVENTOR.
William L. Drayer
BY
Frederick M. Ritchie
His Attorney

United States Patent Office 3,160,153
Patented Dec. 8, 1964

3,160,153
DOMESTIC OVEN
William L. Drayer, Warren, Mich., assignor to General Motors Corporation, Detroit, Mich., a corporation of Delaware
Filed Dec. 21, 1962, Ser. No. 246,388
3 Claims. (Cl. 126—21)

This invention relates to a domestic appliance and more particularly to an improved oven for cooking foods.

In the cooking art it is desirable to maintain even heat distribution in an oven so that food is cooked evenly. In roasting operations grease spatter frequently impinges upon the walls of the oven and becomes baked thereon due to the high temperatures within the oven. Once hardened, this spatter is very difficult to remove.

Accordingly, it is an object of this invention to bar vaporized material from the slightly cool oven walls.

It is a further object of this invention to blanket the interior walls of the oven with a rapidly moving current of air for entraining the oven spatter therein before the spatter deposits on the walls of the oven.

Another object of this invention is the provision of means for filtering the current of air set forth hereinabove to remove the entrained grease spatter.

A further object of this invention is the provision of a filtered air flow through an oven chamber as a heat gradient stabilizer.

Further objects and advantages of the present invention will be apparent from the following description, reference being had to the accompanying drawings wherein a preferred embodiment of the present invention is clearly shown.

Figure 2:
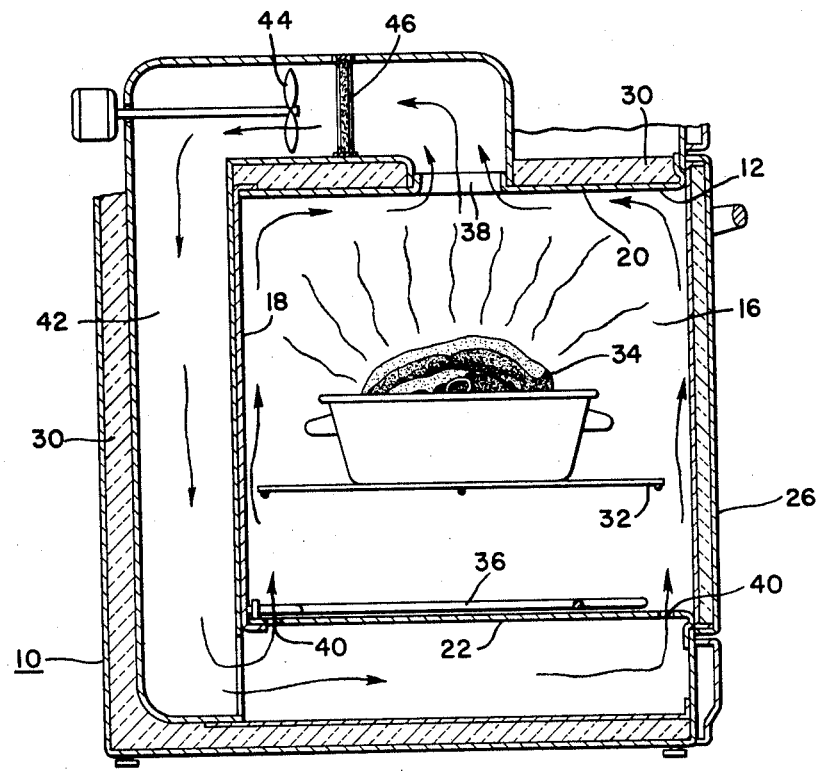

In the drawings:

FIGURE 1 is an exploded perspective view of a domestic oven provided with this invention; and FIGURE 2 is a generally schematic fragmentary side sectional view of the oven in FIGURE 1.

In accordance with this invention and with reference to FIGURES 1 and 2, a domestic oven 10 is shown to include an oven liner or casing 12 having side walls 14, 16, a rear wall 18 a top, wall 20 and a bottom wall 22. The top, bottom and side walls form a front opening 24 closable by an oven door or closure means 26 horizontally pivoted as by a hinge arm 28. Suitable insulation 30 may be provided at selected points between the outside of the oven 10 and the liner 12 to minimize heat loss from the oven chamber. A support rack 32 is slidably removable through the front opening from the oven chamber. Such support may be used to support foodstuff 34, such as a roast of meat. Along the bottom wall 22 of the oven chamber a heating element 36 is positioned to heat the oven chamber for a cooking operation. A similar heating element (not shown) can be supported at the top of the liner 12 for broiling.

In the prior art, the elevated temperatures within the oven chamber cause food stuff 34 to heat and in so doing, greaselike spatter flies from the foodstuff to the surrounding walls of the oven. Much of the deposition of cooking vapors on the walls of domestic ovens can be avoided if the vaporized material is barred from the slightly cooled oven walls. According to the teachings of this invention, the vapor deposition is prevented by inducing a boundary or wall control flow of air which blankets the inside of the liner walls.

To effect this boundary control, the top wall 20 of the oven chamber has an exhaust outlet 38 (FIGURE 2) while the bottom wall 22 has a plurality of inlet slots 40 extending around the periphery of the bottom wall immediately adjacent the vertical walls of the oven chamber. An external duct means 42 connects the exhaust outlet 38 to the inlet slots 40 and includes a motor driven impeller 44 for setting up an air flow shown by the flow arrows in FIGURES 1 and 2. Within the duct 42, a filter 46 is arranged to intercept the recirculating air flow, thereby to remove all greaselike vapors and particulate matter from the circulating air. The filter 46 may be made removable for cleaning the trapped grease thereon.

The size of the blower 44 should be sufficient to induce a tubular blanket of air which completely envelops the foodstuff 34 and to circulate the air with enough velocity to entrain grease spatter before it impinges upon the oven walls—rather an air curtain effect. The bottom wall slots should be positioned in a manner to effect complete coverage of the adjacent walls of the oven. In accomplishing this boundary control of vapor deposition, this invention also effect improved heat distribution throughout the oven chamber by modulating heat concentration areas around the heating element 36.

It should now be seen that an improved oven has been devised wherein a rapidly moving curtain of air completely envelops the cooking foodstuff in a manner to prevent the deposition of grease spatter on the surrounding oven walls.

While the embodiment of the present invention as herein disclosed constitutes a preferred form, it is to be understood that other forms might be adopted.

What is claimed is as follows:

1. A boundary control arrangement for trapping grease spatter in an oven having wall means defining a cooking chamber, support means in said chamber for supporting food to be cooked and means for cooking said food in a manner causing grease to spatter from said food toward said wall means, said boundary control arrangement comprising air passage means including said cooking chamber, said air passage means having air curtain forming means oriented with respect to said wall means and said support means to create a thin, substantially uninterrupted tubular curtain of air solely around the outer portion of said cooking chamber and completely surrounding said support means when air is being circulated in said air passage means, said air curtain forming means defining open slots extending substantially without interruption completely continuously around the outer portion of said cooking chamber generally equidistant from the closest ones of said wall means, and blower means for circulating substantially all of the air in said air passage means at a high volume rate of flow through only said air curtain forming means with a sufficient velocity at least between said support means and said wall means to entrain substantially all of the grease spatter originating at said food before it impinges on said wall means.

2. The boundary control arrangement of claim 1 including means in said air passage means for removing the entrained grease spatter from said circulating air.

3. A boundary control arrangement for trapping grease spatter in an oven having wall means defining a cooking chamber, support means in said chamber for supporting food to be cooked and means for cooking said food in a manner causing grease to spatter from said food toward said wall means, said boundary control arrangement comprising air passage means including said cooking chamber, said air passage means having air curtain forming means oriented with respect to said wall means and said support means to create a thin, substantially uninterrupted tubular curtain of air solely around the outer portion of said cooking chamber and completely surrounding said support means when air is being circulated in said air passage means, said air curtain forming means defining open slots extending substantially without interruption completely continuously around the outer portion of said cooking chamber, and blower means for circulating substantially all of the air in said air passage means at a high volume rate of flow through only said air curtain forming means with a sufficient velocity at least between said support means and said wall means to entrain substantially all of the grease spatter originating at said food before it impinges on said wall means.

References Cited in the file of this patent

UNITED STATES PATENTS

| | | |
|---|---|---|
| 1,218,341 | Truitt | Mar. 6, 1917 |
| 2,412,103 | Spooner | Dec. 3, 1946 |
| 2,511,328 | Cline | June 13, 1950 |
| 2,674,991 | Schaefer | Apr. 13, 1954 |
| 2,862,095 | Schofield | Nov. 25, 1958 |
| 3,063,441 | Stoligrosz | Nov. 13, 1962 |